US012657953B2

(12) United States Patent
Hanson et al.

(10) Patent No.: US 12,657,953 B2
(45) Date of Patent: Jun. 16, 2026

(54) SCENE AUTHENTICATION VIA CAPTURE OF BACKGROUND LIGHT PATTERNS

(71) Applicant: Ford Global Technologies, LLC, Dearborn, MI (US)

(72) Inventors: Ryan Edwin Hanson, Livonia, MI (US); Medha Karkare, Canton, MI (US); Mackenzie Martinez, Commerce Township, MI (US); John Moore, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 18/319,566

(22) Filed: May 18, 2023

(65) Prior Publication Data

US 2024/0386747 A1 Nov. 21, 2024

(51) Int. Cl.
| | |
|---|---|
| *G06V 40/16* | (2022.01) |
| *G06K 7/10* | (2006.01) |
| *G06K 7/14* | (2006.01) |
| *G06V 10/145* | (2022.01) |
| *G06V 20/59* | (2022.01) |
| *H04N 23/74* | (2023.01) |

(52) U.S. Cl.
CPC ....... *G06V 40/166* (2022.01); *G06K 7/10722* (2013.01); *G06K 7/1417* (2013.01); *G06V 10/145* (2022.01); *G06V 20/59* (2022.01); *H04N 23/74* (2023.01)

(58) Field of Classification Search
CPC .... G06V 20/59; G06V 20/593; G06V 20/597; G06V 40/166; G06V 10/145; G06F 21/32
See application file for complete search history.

(56) References Cited

U.S. PATENT DOCUMENTS

| | | | |
|---|---|---|---|
| 8,068,636 B2 | 11/2011 | Rodreiguez et al. | |
| 9,940,684 B2 | 4/2018 | Reed et al. | |

(Continued)

FOREIGN PATENT DOCUMENTS

| | | | | | |
|---|---|---|---|---|---|
| CN | 108445643 A | * | 8/2018 | ......... | G02B 27/4205 |
| CN | 113767396 A | * | 12/2021 | ........... | G06V 10/147 |

(Continued)

OTHER PUBLICATIONS

M. P. Segundo, S. Sarkar, D. Goldgof, L. Silva and O. Bellon, "Continuous 3D Face Authentication Using RGB-D Cameras," 2013 IEEE Conference on Computer Vision and Pattern Recognition Workshops, Portland, OR, USA, 2013, pp. 64-69, doi: 10.1109/CVPRW.2013.17. (Year: 2013).*

(Continued)

*Primary Examiner* — Michael Robert Cammarata
(74) *Attorney, Agent, or Firm* — Christopher Storms; Brooks Kushman P.C.

(57) ABSTRACT

A computer includes a processor and a memory, the memory stores instructions executable by the processor to project a first specified time-varying illumination pattern to an area outside of an object undergoing authentication, to capture images of the object and a portion of the area outside of the object, and to authenticate a scene that includes the images based on a comparison between the first specified time-varying illumination pattern with a second time-varying illumination pattern extracted from the images.

20 Claims, 6 Drawing Sheets

(56) References Cited

U.S. PATENT DOCUMENTS

| | | | | |
|---|---|---|---|---|
| 10,679,082 | B2 | 6/2020 | Hecker et al. | |
| 10,915,618 | B2 | 2/2021 | Tussy | |
| 11,200,634 | B2 | 12/2021 | Kulkarni et al. | |
| 12,346,421 | B1 * | 7/2025 | Tougas | G06V 40/10 |
| 2018/0157267 | A1 * | 6/2018 | Gao | B60K 35/10 |
| 2019/0051069 | A1 * | 2/2019 | Cooley | G07B 15/00 |
| 2019/0347813 | A1 * | 11/2019 | Gernoth | H04N 23/50 |
| 2021/0241409 | A1 | 8/2021 | Nayshtut et al. | |
| 2022/0108228 | A1 * | 4/2022 | Salter | E05B 81/77 |
| 2022/0230454 | A1 * | 7/2022 | Klug | G06V 10/145 |
| 2022/0292797 | A1 * | 9/2022 | Ben Abdelaziz | G06V 20/59 |
| 2022/0343677 | A1 * | 10/2022 | Kawase | G06V 40/166 |
| 2024/0087612 | A1 * | 3/2024 | Noël | G06K 19/06028 |
| 2024/0242471 | A1 * | 7/2024 | Lev | G06F 21/645 |
| 2024/0348603 | A1 * | 10/2024 | Tussy | G06V 40/167 |

FOREIGN PATENT DOCUMENTS

| | | | | | | |
|---|---|---|---|---|---|---|
| EP | | 3361419 | B1 * | 3/2023 | ......... | G06K 7/10821 |
| MY | | 175091 | A * | 6/2020 | .......... | G06V 10/143 |
| WO | WO-2024231531 | A1 * | 11/2024 | | ............ | G06F 21/32 |
| WO | WO-2025045642 | A1 * | 3/2025 | | ............ | G06F 21/32 |

OTHER PUBLICATIONS

G. Saadouli, et al., "Automatic and Secure Electronic Gate System Using Fusion of License Plate, Car Make Recognition and Face Detection," 2020 IEEE Int'l Conf on Informatics, IoT, and Enabling Technologies (ICIoT), Doha, Qatar, 2020, pp. 79-84, doi: 10.1109/ICIoT48696.2020.9089615. (Year: 2022).*

Abdullakutty, Faseela, Pamela Johnston, and Eyad Elyan. "Fusion methods for face presentation attack detection." Sensors 22.14 (2022): 5196. (Year: 2022).*

X. Huang, Q. Huang and N. Zhang, "Dual fusion paired environmental background and face region for face anti-spoofing," 2021 5th Asian Conference on Artificial Intelligence Technology (ACAIT), Haikou, China, 2021, pp. 142-149, doi: 10.1109/ACAIT53529.2021.9731173. (Year: 2021).*

Albakri G, Alghowinem S. The Effectiveness of Depth Data in Liveness Face Authentication Using 3D Sensor Cameras. Sensors (Basel). Apr. 24, 2019;19(8):1928. doi: 10.3390/s19081928. PMID: 31022904; PMCID: PMC6515036. (Year: 2019).*

Singh M., Arora A. A Novel Face Liveness Detection Algorithm with Multiple Liveness Indicators. Wirel. Pers. Commun. 2018;100: 1677-1687. doi: 10.1007/s11277-018-5661-1. (Year: 2018).*

Bell, Tyler, Beiwen Li, and Song Zhang. "Structured light techniques and applications." Wiley encyclopedia of electrical and electronics engineering (1999): 1-24 (Year: 1999).*

E. Derman and A. A. Salah, "Continuous Real-Time Vehicle Driver Authentication Using Convolutional Neural Network Based Face Recognition," 2018 13th IEEE International Conference on Automatic Face & Gesture Recognition (FG 2018), Xi'an, China, 2018, pp. 577-584, doi: 10.1109/FG.2018.00092. (Year: 2018).*

Tsalakanidou, Filareti, et al. "Real-time acquisition of depth and color images using structured light and its application to 3D face recognition." Real-Time Imaging 11.5-6 (2005): 358-369. (Year: 2005).*

Mishra, Ashutosh, et al. "In-cabin monitoring system for autonomous vehicles." Sensors 22.12 (2022): 4360 (Year: 2022).*

Uehira et al., "Digital watermarking technique using brightness-modulated light", https://ieeexplore.ieee.org/document/4607420, DOI: 10.1109/ICME.2008.4607420.

* cited by examiner

102

100

106

COMM. COMPONENT 114

HMI 112

COMPONENTS 110

COMPUTER 104

NON-CAMERA SENSORS 108

ILLUMINATION CONTROLLER 118

200

250

120

120

120

265

260

105

SCENE AUTHENTICATION VIA CAPTURE OF BACKGROUND LIGHT PATTERNS

BACKGROUND

Vehicles are often equipped with cameras, which facilitate observation of an environment external to the vehicle as well as areas internal to the vehicle. For example, a camera positioned internal to the vehicle can be utilized to provide recognition of an operator's facial and/or other features. In a vehicle-based facial recognition system, a vehicle computer can compare parameters of a captured image of the facial and/or other features of an individual in the driver's seat of the vehicle with a set of stored parameters to determine whether an authorized individual is attempting to operate the vehicle.

DETAILED DESCRIPTION

Figure 1:
FIG. 1 is a block diagram of an example vehicle.

This disclosure provides techniques for authenticating a scene that includes an image of an individual's facial and/or other features prior to permitting the individual to access a computer or computer system, e.g., to operate a vehicle. In example techniques, images of an individual's facial and/or other features may be utilized in a facial recognition process to biometrically identify the individual, thereby allowing the individual to operate the vehicle and/or components thereof. Operation of the vehicle or vehicle components may include starting the vehicle, controlling propulsion of the vehicle, steering the vehicle, accessing a human-machine interface (HMI), etc. In a facial recognition process, features of the individual's face and/or other portions of the individual may be compared with a set of stored facial and/or other parameters that permit a computer of the vehicle to identify an operator and to determine whether the operator is authorized to operate the vehicle and/or access or carry out other operations in the vehicle. In some instances, prior to obtaining facial-recognition-based access to the vehicle, an operator may participate in an enrollment process. In an enrollment process, a camera of the vehicle may capture images of the operator's facial and other features from various angles, which allows an onboard vehicle computer to recognize the individual's facial and/or other features at various orientations of the individual's facial features with respect to the camera.

In some situations, such an unauthorized individual attempting to operate the vehicle, the individual may attempt to tamper with a captured image depicting facial and/or other features. To address such tampering with a captured image of an individual's facial and/or other features, captured images of the individual's facial and/or other features may be stored in a secured memory area of a computer data store. The secured memory area may then be accessed following, and typically only following, completion of various security measures. Such measures may include encryption of data files that include facial images as well as parameters extracted from such data files. Security measures may alternatively or additionally include storage of data files that include facial images at memory locations available exclusively to certain secured computing devices.

In addition to securing data files that include facial images, security of data files that include images of an individual's facial and/or other features may be enhanced by authenticating an entire scene captured by a vehicle camera. In this context, a camera "scene" is defined as a camera image that includes an image of an individual's facial and/or other features as well as images of an area outside of the individual's facial and/or other features. Thus, for example, a camera scene may include an image of an individual's face as well as images depicting areas in a background area or foreground area with respect to the individual's face. In an example, a camera scene may include portions of a steering wheel, which may be observed to be in the foreground of an individual's face, as well as a vehicle headliner, sunroof, windows, and headrest, which may be observed to be behind, or to the left or right of, the individual's face. Thus, exercising control over features observed to be outside of an image of an individual's facial and other features, e.g., in foreground or background areas, may enhance the integrity of an entire scene captured by a vehicle camera during a facial recognition process.

Advantageously, in accordance with programming executed by a vehicle computer, a vehicle's interior lighting system may be controlled to generate specified illumination of areas in the background, foreground, and/or to the left or to the right of the face of an individual seated in the vehicle's driver seat. Such control can facilitate the generation of time-varying illumination patterns observable in areas outside of an area encompassing an individual's facial and/or other features. The time-varying illumination pattern can then be captured by the vehicle camera along with an image of an individual's facial and other features. The captured scene can then be digitized, transmitted via the vehicle communications bus, and stored in a secure memory accessible exclusively by the vehicle computer. The vehicle's computer can then analyze the captured scene and compare parameters extracted from the captured scene with the specified time-varying illumination pattern. Based on a consistency between the specified time-varying illumination pattern executed under the control of the vehicle computer, the vehicle computer can determine that the scene captured by the vehicle camera is authentic. Based on an inconsistency between the specified time-varying illumination pattern and extracted parameters from one or more portions of the captured scene, the vehicle computer can determine that the captured scene is not authentic and can thus prohibit the individual from operating the vehicle. Thus, advantageously, in addition to determining whether an individual's facial and/or other features are consistent with the corresponding features of an authorized operator, the vehicle computer can authenticate, verify, and/or validate the actual scene utilized in a facial recognition process.

In this context, facial and/or other features of an operator can be determined to be consistent with facial and/or other features of an authorized operator in response to measured parameters deviating by less than a threshold amount. Thus, for example, extracted facial and/or nearby features of an individual seated in the driver's seat of vehicle 102 may be determined to be consistent with those of an authorized operator in response to a measured distance between the eyes of operator 260, a measured distance between a point that is equidistant between the eyes of operator 260 and the nose of operator 260, and/or a measured distance between the eyes of operator 260 and the mouth of operator 260, etc., deviating from corresponding features of an authorized operator by, for example, less than 5%, less than 10%, etc. Alternatively, or in addition to, consistency between facial and/or other features of an individual seated in the driver's seat of vehicle 102 and an authorized operator of the vehicle may be determined utilizing the Viola Jones technique, a histogram of oriented gradients, and/or techniques that utilize a convolutional neural network.

Although examples herein include facial recognition utilizing an illumination pattern visible outside of ellipse 265, alternatively, ellipse 265 may encompass another object. For example, in a fingerprint verification application, an illumination pattern can be projected so as to be visible outside of the individual's fingerprint region, which can be advantageous in authenticating a digitized scene that includes the individual's fingerprint region. In such an example, a camera can capture a scene that includes an ellipse, or other contour that encompasses the portion of an individual's utilized for fingerprint verification, while an illumination pattern is projected to areas outside of the contour. In another example, such as in a computer vision application that operates to authenticate images of manufactured objects, an illumination pattern can be projected so as to be visible outside of the area encompassing the manufactured object, thereby authenticating a scene that includes the image of the manufactured object. In another example, which involves an individual accessing an automatic teller machine (ATM), an illumination pattern can be projected so as to be visible outside of an area encompassing an individual's facial and/or other features. In response to comparison of an illumination pattern visible outside of an area encompassing the individual's facial and/or other features with an illumination pattern specified by a computer, the scene that includes the individual's facial and/or other features can be authenticated. Accordingly, techniques described herein can be applied to enhance security measures in a wide variety of example scenarios in which a scene that includes an image of an object, such as an individual's facial and/or other features, an individual's fingerprint region, a manufactured object, etc., can be authenticated.

In an example, a scene authentication system can include a computer including a processor coupled to a memory, in which the memory stores instructions including instructions executable by the processor to project a first specified time-varying illumination pattern to an area outside of an object undergoing authentication. The instructions can additionally include instructions to capture images of the object and a portion of the area outside of the object and to authenticate a scene including the images based on a comparison between the first specified time-varying illumination pattern with a second time-varying illumination pattern extracted from the images.

In an example, the captured images are images in a video segment.

In an example, the object is a portion of an operator's face.

In an example, the first specified time-varying illumination pattern includes a pattern of colored lighting projected on a background area outside of the object.

In an example, the first specified time-varying illumination pattern includes strobing of lighting projected on a background area outside of the object.

In an example, the first specified time-varying illumination pattern includes time-varying projection of one or more spots projected on a background area outside of the object.

In an example, the first specified time-varying illumination pattern includes a time-varying pattern of symbols projected on a background area outside of the object.

In an example, the first specified time-varying illumination pattern includes a quick response (QR) code.

In an example, the instructions to compare the first specified time-varying illumination pattern with the second time-varying illumination pattern further include instructions to determine consistency between the first specified time-varying illumination pattern with a third time-varying illumination pattern projected on a semi-transparent lens protector of a camera to capture the images of the object.

In an example, the first specified time-varying illumination pattern includes illumination utilizing wavelengths that are outside of the visible light spectrum.

In an example, the area outside of the object undergoing authentication includes an interior portion of a vehicle.

In an example, the area outside of the object undergoing authentication includes a headliner portion of a vehicle.

A method for scene authentication can include projecting a first specified time-varying illumination pattern to an area outside of an object undergoing authentication, capturing images of the object and a portion of the area outside of the object, and authenticating a scene including the images based on comparing the first specified time-varying illumination pattern with a second time-varying illumination pattern extracted from the images.

In an example, capturing images includes capturing video images.

In an example, projecting the first specified time-varying illumination pattern includes projecting a pattern of colored lighting on a background area outside of the object.

In an example, projecting the first specified time-varying illumination pattern includes strobing of lighting visible on a background area outside of the object.

In an example, projecting the first specified time-varying illumination pattern includes projecting one or more spots on a background area outside of the object.

In an example, projecting the first specified time-varying illumination pattern includes projecting a symbol on a background area outside of the object.

In an example, the area outside of the object undergoing authentication includes an interior portion of a vehicle.

In an example, the area outside of the object undergoing authentication includes a headliner portion of a vehicle.

FIG. 1 is a block diagram of an example vehicle. As seen in FIG. 1, system 100 includes vehicle 102, which includes computer 104 that is communicatively coupled via an internal communication network, such as vehicle network 106, to various elements including camera 105 and non-camera sensors 108, subsystems or components 110 such as steering, propulsion and braking, human machine interface (HMI) 112, communication component 114, and illumination controller 118. Vehicle computer 104 includes a processor and a memory. A memory of computer 104, such as those described herein, includes one or more forms of computer-readable media, and stores programming instructions executable by vehicle computer 104 for performing various operations, such that the vehicle computer is configured to perform the various operations, including those disclosed herein.

For example, vehicle computer 104 can be a generic computer with a processor and memory as described above and/or may include an electronic control unit (ECU) or a controller for a specific function or set of functions, and/or may include a dedicated electronic circuit including an ASIC (application specific integrated circuit) that is manufactured for a particular operation, e.g., an ASIC for processing data from camera 105 and non-camera sensors 108 and/or communicating data from camera 105 and non-camera sensors 108. In another example, vehicle computer 104 may include an FPGA (Field-Programmable Gate Array), which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in computer 104. Further, vehicle computer 104 could include a plurality of computers 104 onboard vehicle 102, e.g., a plurality of ECUs (electronic control units) or the like, operating together to perform operations ascribed herein to vehicle computer 104.

The memory accessible by computer 104 can be of any type, e.g., hard disk drives, solid state drives, servers, or any volatile or non-volatile media. The memory can store the collected data sent from camera 105 and non-camera sensors 108. The memory can be a separate device from computer 104, and computer 104 can retrieve information stored by the memory via a communication network in the vehicle such as vehicle network 106, e.g., over a controller area network (CAN) bus, a local interconnect network (LIN) bus, a wireless network, etc. Alternatively or additionally, the memory can be part of computer 104, e.g., as a memory of computer 104.

Computer 104 can include programming in the form of executable instructions, which operate one or more components 110 such as vehicle brakes, propulsion (e.g., one or more of an internal combustion engine, electric motor, hybrid engine, etc.), steering, climate control, interior and/or exterior lights, etc., as well as to determine whether and when computer 104, as opposed to a human operator, is to control such operations. Computer 104 may include or be communicatively coupled to, e.g., via vehicle network 106, such as a communications bus as described further below, more than one processor, e.g., included in components 110 such as non-camera sensors 108, electronic control units (ECUs) or the like included in the vehicle for monitoring and/or controlling various vehicle components, e.g., a powertrain controller, a brake controller, a steering controller, etc.

Computer 104 is generally arranged for communications on vehicle network 106, which can include a communications bus in the vehicle, such as a CAN bus or the like, and/or other wired and/or wireless mechanisms. Vehicle network 106 is a communications network via which messages can be exchanged between various devices, e.g., camera 105, non-camera sensors 108, components 110, computer 104(s), etc., onboard vehicle 102. Computer 104 can be generally programmed to send and/or receive, via vehicle network 106, messages to and/or from other devices in vehicle, e.g., any or all of ECUs, camera 105, non-camera sensors 108, actuators, components 110, communications component 114, human machine interface (HMI) 112, etc. For example, various component 110 subsystems (e.g., components 110 can be controlled by respective ECUs) and/or non-camera sensors 108 may provide data to computer 104 via vehicle network 106.

Non-camera sensors 108 may correspond to a device(s) that can obtain one or more measurements of one or more physical phenomena. Some of non-camera sensors 108 may detect internal states of the vehicle, for example, wheel speed, wheel orientation, and engine and transmission variables. Some of non-camera sensors 108 may operate to detect the position or orientation of the vehicle utilizing, for example, global positioning system GPS sensors; accelerometers, such as piezo-electric or microelectromechanical systems (MEMS); gyroscopes, such as rate, ring laser, or fiber-optic gyroscopes; inertial measurements units (IMUs); and magnetometers. Some of non-camera sensors 108 may detect the external world, for example, radar sensors, scanning laser range finders, light detection and ranging (LIDAR) devices, and image processing sensors such as cameras. A LIDAR device operates to detect distances to objects by emitting laser pulses and measuring the time of flight for the pulse to travel to the object and back to the emitter.

Computer 104 may be configured for communicating through a wireless communication interface with a second vehicle, e.g., via a vehicle-to-vehicle (V2V), a vehicle-to-infrastructure (V-to-I) communication, and/or a vehicle-to-everything (V2X) communication network (i.e., communications that can include V2V and V2I). Some of non-camera sensors 108 are communications devices, for example, vehicle-to-infrastructure V2I or V2V devices, which may operate via a wireless communications network. Communications component 114 may include elements for sending (i.e., transmitting) and receiving radio frequency (RF) communications, e.g., chips, antenna(s), transceiver(s), etc. Communications component 114 represents one or more mechanisms by which computer 104 of vehicle 102 may communicate with other vehicles, and/or elements of a communications infrastructure and may be one or more of wireless communication mechanisms, including any desired combination of wireless and wired communication mechanisms and any desired network topology (or topologies when a plurality of communication mechanisms are utilized). Exemplary V2X communication protocols include cellular, IEEE 802.11, dedicated short-range communications (DSRC), and/or wide area networks (WAN), including the Internet, providing data communication services. DSRC may have one-way or two-way short-range to medium-range wireless communication channels. A V2X communication network may have multiple channels, each identified by an identifier, e.g., channel number.

Further, in examples in which computer 104 actually comprises a plurality of devices, vehicle network 106 may be utilized to conduct communications between devices represented as computer 104 in this disclosure. For example, vehicle network 106 can include a controller area network (CAN) in which messages are conveyed via a CAN bus, or a local interconnect network (LIN) in which messages are conveyed via a LIN bus. In some implementations, vehicle network 106 can include a network in which messages are conveyed using other wired communication technologies and/or wireless communication technologies, e.g., Ethernet, wireless fidelity (WiFi®), Bluetooth®, etc. Additional examples of protocols that may be used for communications over vehicle network 106 in some implementations include, without limitation, Media Oriented System Transport (MOST), Time-Triggered Protocol (TTP), and FlexRay. In some implementations, vehicle network 106 can represent a combination of multiple networks, possibly of different types, that support communications among devices in a vehicle.

Computer 104 may additionally include programming to control operations performed by illumination controller 118. For example, illumination controller 118 can be a separate computing entity for controlling lower-level functions of numerous illumination sources 120, such as dimming, on/off timers, etc. Alternatively, functions illumination controller 118 can include a block of executable programming that operates under the control of a processor of computer 104. Illumination sources 120 may be attached to a headliner of vehicle 102, as well as to doors, sun visors, glove boxes, rear-view mirrors, etc. Illumination sources 120 may each generate illumination visible at a portion of the interior of vehicle 102. Thus, a first one of illumination sources 120 mounted to the headliner of vehicle 102 may illuminate a first portion of the headliner, while a second one of illumination sources 120 mounted to the headliner may illuminate a second portion of the headliner. Illumination sources 120 may generate illumination in a range of wavelengths detectable by camera 105. For example, illumination sources 120 may generate illumination outside of a visible range (i.e., 400 nanometer to 700 nanometer), infrared (i.e., greater than 700 nanometers), ultraviolet (i.e., less than 400 nanometers), etc. Illumination sources 120 can include any suitable apparatus that can produce or emit light at desired wavelengths, e.g., for visible light, an illumination source 120 could include tungsten, halogen, high-intensity discharge (HID) such as xenon, light-emitting diodes (LED), etc. For generating light at infrared wavelengths, illumination sources 120 could include LEDs, lasers, filtered incandescent lamps, etc.

In examples, illumination sources 120 may be utilized to project time-varying color patterns, such as colors that vary from red, to green, to blue, or any combinations thereof. Illumination sources 120 may be individually controllable so that each of illumination sources 120 can project its own time-varying color pattern that is independent of others of illumination sources 120. Thus, for example, computer 104 may direct a first one of illumination sources 120 to project a time-varying color pattern that varies sequentially from red, to green, to blue, while a second one of illumination sources 120 can generate a time-varying color pattern that varies sequentially from blue, to green, to red. Illumination sources 120 typically can be directed to individually blink or strobe in any suitable combination of colors. For example, illumination sources 120 mounted to the headliner of vehicle 102 can operate to project images, such as barcodes, QR codes, graphic symbols (e.g., glyphs), dots, spots, or any other type of pattern, which may be time-varying, onto a portion of the headliner.

Camera 105 can operate to detect electromagnetic radiation in a range of wavelengths. For example, camera 105 may detect visible light, infrared radiation, ultraviolet light, or some range of wavelengths including visible, infrared, and/or ultraviolet light. For example, camera 105 can include image sensors such as charge-coupled devices (CCD), active-pixel sensors such as complementary metal-oxide semiconductor (CMOS) sensors, etc. Camera 105 may be configured to detect illumination from respective illumination sources 120, i.e., the range of wavelengths of electromagnetic radiation detectable by the camera 105 completely or significantly overlaps the range of wavelengths produced by the respective vehicle illumination sources 120.

Exemplary System Operations

Figure 2:
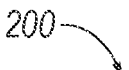
FIG. 2 depicts an example scene captured by a camera of the vehicle.

FIG. 2 depicts an example scene 200 captured by camera 105 of vehicle 102. For example, camera 105 can capture a scene that includes an image of the facial and/or other features of operator 260, which may be utilized by computer 104 to perform in a facial recognition process to identify operator 260. The scene captured by camera 105 can additionally include areas other than the area encompassing the facial features of operator 260, such as areas in the background, foreground, or to the sides of operator 260. In response to computer 104 determining that an illumination pattern visible in the background, foreground, or to the sides of operator 260, is consistent with an illumination pattern specified by computer 104, the computer may determine that the scene captured by camera 105 is an authentic scene. Determining that the scene captured by camera 105 is authentic may preclude substitution of the captured scene by an unauthorized individual, who may be attempting to obtain unauthorized access to vehicle 102.

As seen in FIG. 2, a portion of headliner 250 is visible to camera 105. Illumination sources 120 include an illumination source positioned beneath a rearview mirror of vehicle 102 as well as illumination sources mounted to or in the vehicle cabin, e.g., in a headliner 250 (i.e., a covering of a cabin interior, e.g., a ceiling). Camera 105 is capable of capturing a scene which includes the facial and/or other features of operator 260 positioned in the driver's seat of vehicle 102. Thus, in the scene captured via camera 105, the facial features of operator 260, which are substantially confined within ellipse 265, can be analyzed by computer 104 executing image signal processing to provide facial recognition of operator 260. In an example, facial recognition can be achieved by extracting facial, and/or nearby features, within ellipse 265, such as an observed distance between the eyes of operator 260, an observed distance between a point that is equidistant between the eyes of operator 260 and the nose of operator 260, an observed distance between the eyes of operator 260 and the mouth of operator 260, etc. Extracted features can then be compared with corresponding features of individuals who are authorized to operate vehicle 102.

Advantageously, in addition to camera 105 capturing an image of the facial and/or other features of operator 260 within ellipse 265 for analysis by computer 104, camera 105 can capture portions of scene 200 that include objects in the foreground, background, and to the sides of ellipse 265. Thus, for example, camera 105 can capture an image of the steering wheel of vehicle 102, an image of a portion of the headrest to the left of ellipse 265, and an image of a portion of the headliner 250. In an example, in response to one or more of illumination sources 120 illuminating a portion of headliner 250, the illuminated portion is visible to camera 105. Further, in response to one or more of illumination sources 120 emitting colored light, e.g., red, blue, green, etc., an illuminated portion of headliner 250 is visible in the scene captured by camera 105.

Computer 104 can execute programming to control illumination sources 120 as part of a larger access control process, which can include controlling door locking/unlocking functions responsive to detection of a signal from an operator's wireless key, for example, determining if an operator's facial and/or other features are consistent with facial features of an authorized operator, etc. In an access control process, for example, computer 104 may select an illumination pattern from among a variety of possible illumination patterns capable of being generated by illumination sources 120. Illumination patterns, and/or parameters utilized to generate illumination patterns, can be stored in a memory of, or accessible to, computer 104. Selection of an illumination pattern can be random and/or can be selected according to any other criteria such as time of day, amount and type of ambient illumination in an environment external to vehicle 102, etc. Computer 104 can then specify the selected illumination pattern to illumination controller 118.

In an example which includes camera 105 operating to capture a video segment of scene 200, as specified by programming of computer 104, one or more of illumination sources 120 may generate a time-varying illumination pattern visible on the surface of headliner 250. Camera 105 can then capture a video segment during which the time-varying illumination pattern is visible on the surface of headliner 250 for analysis by computer 104. Computer 104 can execute instructions for image signal processing of the video segment to extract parameters from the video segment comprising the captured images. Computer 104 can then determine whether a consistency exists between the extracted parameters and the time-varying illumination pattern specified by programming of computer 104. Responsive to computer 104 determining that a consistency exists between extracted parameters and the pattern specified by computer 104, computer 104 can authenticate the video scene. Computer 104 can then execute an operation to determine whether the facial and/or other features within ellipse 265 correspond to those of an authorized operator of vehicle 102.

Figure 3B:
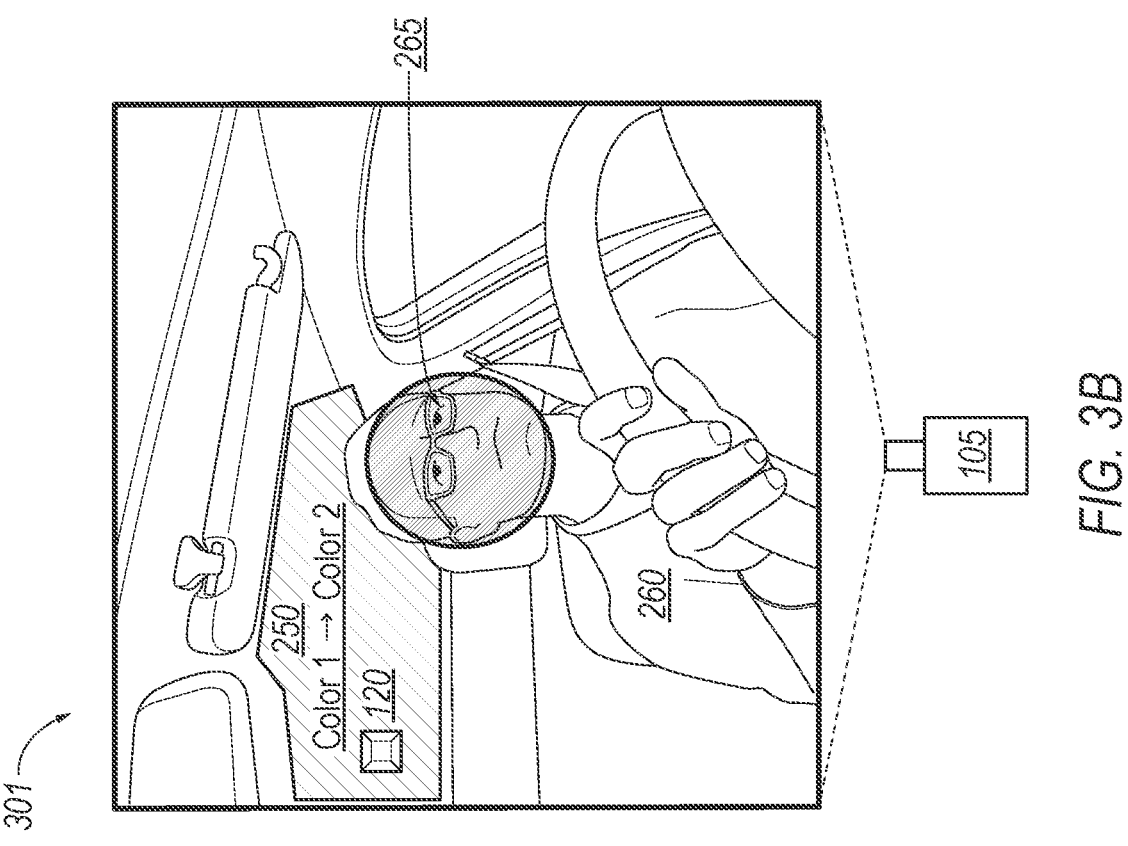
FIGS. 3A, 3B, 3C, and 3D depict example scenes captured by a camera of the vehicle for scene authentication.
Figure 3A:
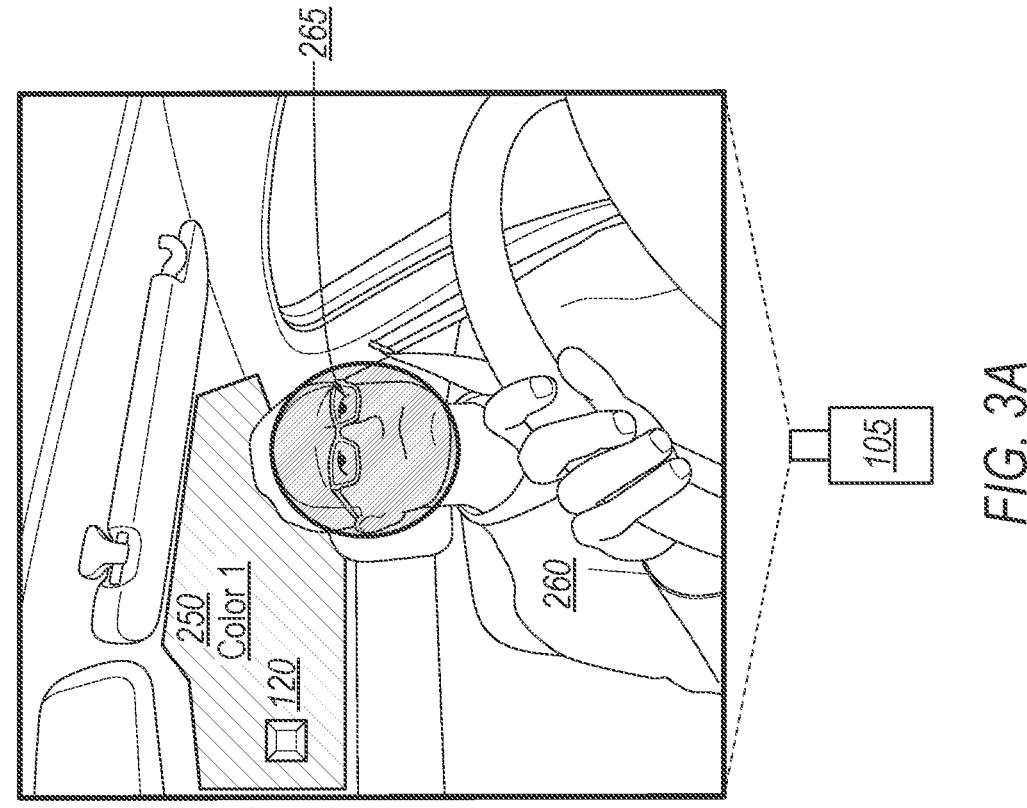

FIGS. 3A, 3B depict example scenes 300, 301 (respectively) of scenes captured by a camera of the vehicle for scene authentication. In FIG. 3A, camera 105 is indicated as capturing an image of operator 260, which includes the operator's facial and/or other features within ellipse 265. Scene 300 additionally depicts a portion of headliner 250, which has been illuminated utilizing a first color (color 1) specified by of computer 104. Thus, in an example in which camera 105 comprises a camera capable of capturing still images, illumination source 120 may be directed to produce colored light of a specific wavelength, or within a range of wavelengths, which can be captured in a scene comprising operator 260 and headliner 250. Computer 104 may then execute instructions for image signal processing to extract color parameters to determine whether the extracted color parameter, e.g., color 1, is consistent with the color specified by computer 104. In response to determining that the color specified by computer 104 is consistent with color parameters extracted from the image captured by camera 105, computer 104 can authenticate scene 300. Although the examples of FIGS. 3A, 3B, 3C, and 3D describe authentication of a scene, e.g., 300, 301, 302, 303, that includes an image of operator 260, the described techniques can be applied to a variety of example circumstances, such as those involving authentication of a scene that includes an individual's fingerprint, authentication of a scene that includes an ATM customer's facial and/or other features, authentication of a scene that includes the facial and/or other features of an individual attempting to gain access to a building, authentication of a scene that includes a manufactured object, etc.

In an example in which camera 105 is capable of capturing video segments comprising multiple images of operator 260 and headliner 250, computer 104 can direct illumination sources 120 to generate a time-varying illumination pattern. A time varying illumination pattern may include, for example, time-sequenced strobing or blinking of illumination source 120 utilizing a first color (e.g., color 1), or may include dimming and brightening of light comprising color 1 generated by illumination source 120. Camera 105 can then capture images of scene 300 for analysis by computer 104 executing instructions for image signal processing of captured images. Based on computer 104 determining that parameters extracted from the captured images, e.g., presence of blinks or strobes of illumination source 120 at specified time intervals, computer 104 may determine that scene 300 is authentic.

In FIG. 3B, under the control of computer 104, headliner 250 is illuminated utilizing a time-sequenced pattern of a first color (color 1) during a first interval followed by a second color (color 2) during a second interval, which may be generated by illumination source 120. Thus, in an example, illumination sources 120 can be directed to generate light having a time-varying color pattern that includes color 1 during a first time interval followed by color 2 during a second time interval. Camera 105, which can be capable of capturing video segments corresponding to scenes 300 and 301, can then capture images of headliner 250 for analysis by computer 104. Based on computer 104 determining that parameters extracted from the captured video segment are consistent with the time-varying color pattern specified by computer 104, the computer may determine that the video segment that includes scene 301 is authentic.

In other examples, illumination sources 120 may generate any suitable combination of strobing or blinking of light illuminating headliner 250 as specified by computer 104. For example, a first one of illumination sources 120 can be directed to generate a first color, e.g., color 1, simultaneously with a second one of illumination sources 120 generating a second color, e.g., color 2. Accordingly, in examples, computer 104 may specify colors to be generated by illumination sources 120, timing (and duration) of illumination by illumination sources 120, blinking or strobing of illumination sources 120, and numerous other types of time-varying patterns that can illuminate headliner 250. Captured scenes, which may comprise still images and/or video segments, can then be analyzed so that color, timing, and other parameters can be extracted. Extracted parameters can then be compared with parameters specified by computer 104 to determine authenticity of a scene captured by camera 105.

Figure 3D:
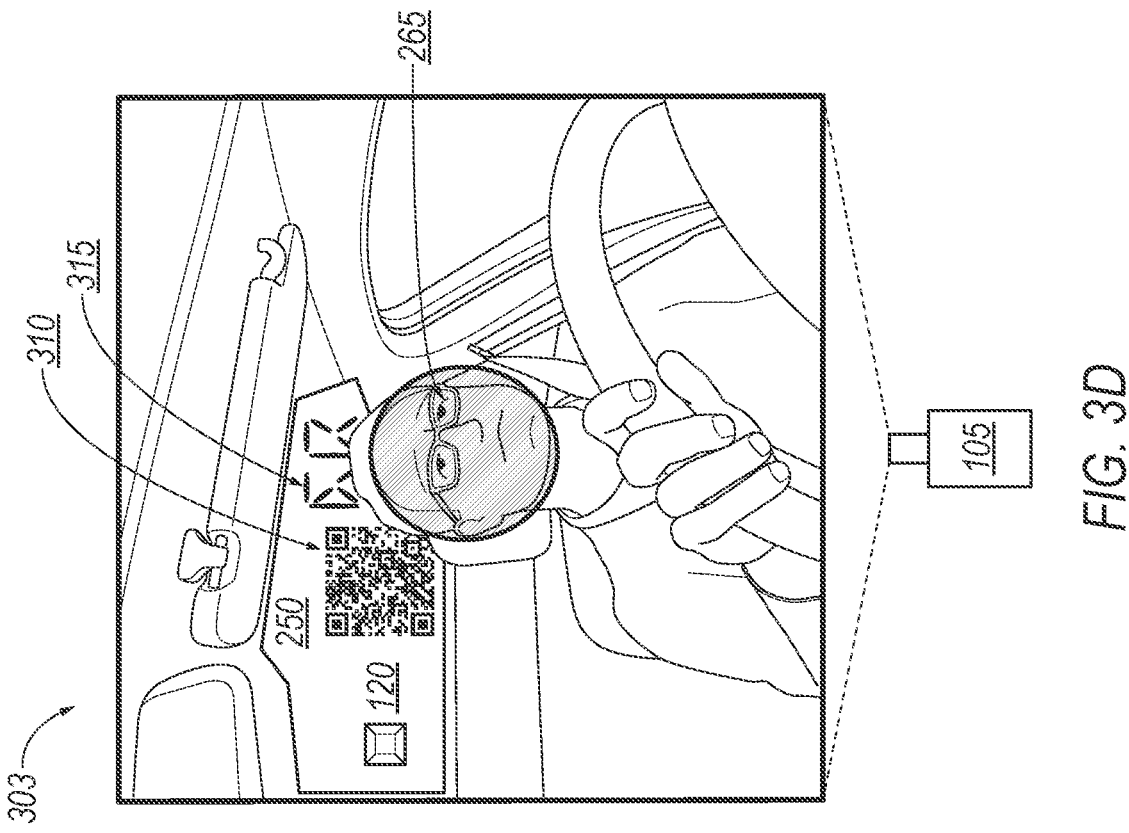
Figure 3C:
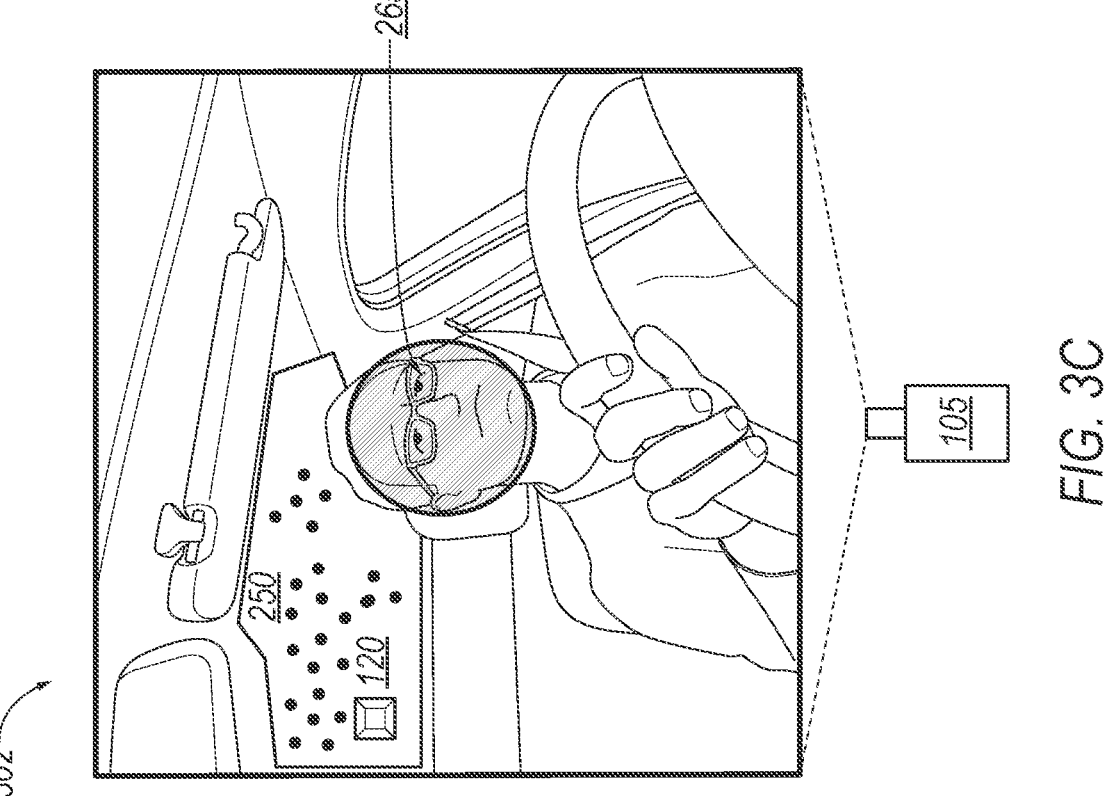

FIGS. 3C, 3D depict example scenes 302, 303 of a scene captured by a camera of the vehicle for scene authentication. As seen in FIG. 3C, as specified by computer 104, illumination source 120 can generate light spots visible on the surface of headliner 250. In turn, camera 105 can capture a scene including an image of a portion of headliner 250. Computer 104 can perform image signal processing to extract parameters of the portion of the captured scene encompassing the light spots. Extracted parameters of the light spots, such as locations of the light spots in the field-of-view of camera 105, the number of light spots in the camera field-of-view, the color of the light spots, changes in intensity of the light spots (e.g., dimming or brightening of light spots), and other parameters. Computer 104 can then compare the extracted parameters with parameters previously specified by computer 104 to determine if a consistency exists between the specified parameters and parameters of the observed light spots. On the basis of such comparison, computer 104 can authenticate scene 302.

In FIG. 3D, computer 104 can direct illumination source 120 to generate a machine-readable code that includes an array of black-and-white squares such as, for example, quick response (QR) code 310. Also shown in the example of FIG. 3D, computer 104 can direct illumination source 120 to generate graphic symbol 315, or any other type of symbol, which may be visible on the surface of headliner 250. In turn, camera 105 can capture a scene including an image of the portion of headliner 250 that encompasses QR code 310 and/or graphic symbol 315 for analysis by computer 104. Extracted parameters and/or content of QR code 310 and/or graphic symbol 315 may then be compared with a QR code and/or a graphic symbol specified by computer 104 to determine if there is consistency between QR code 310 and/or graphic symbol 315. In an example, consistency among parameters of QR code 310 or graphic symbol 315 can be determined based on a threshold similarity (e.g., 85%, 90%, 95%, etc.) and the QR code or graphic symbol specified by computer 104. On the basis of such comparison, computer 104 can authenticate scene 303.

Figure 4:
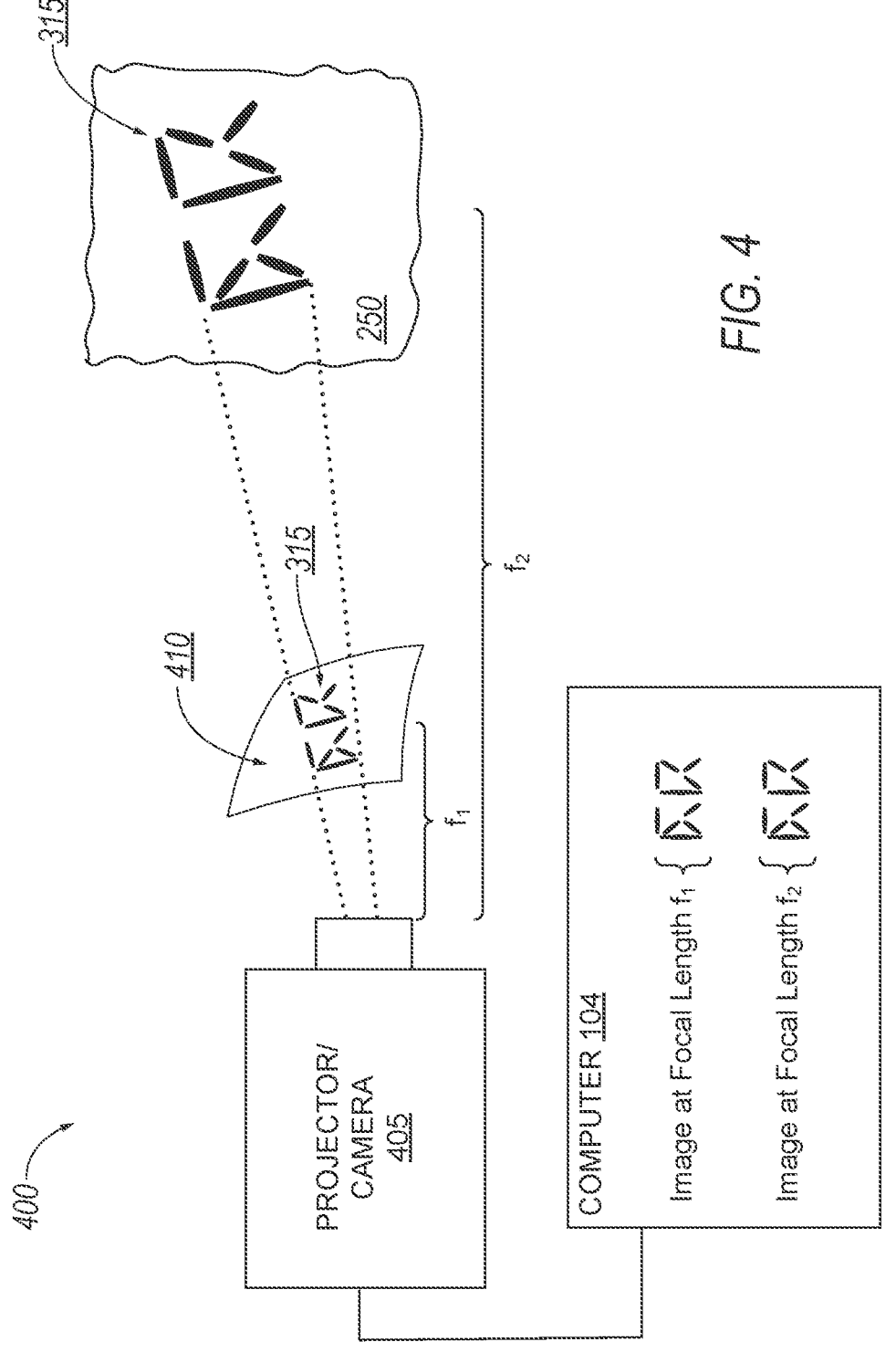
FIG. 4 is a block diagram of an example technique for scene authentication.

FIG. 4 is a block diagram 400 of an example technique for scene authentication. The example of FIG. 4 operates to further authenticate a scene including images of operator 260 by confirming that images captured by a camera have not undergone manipulations, such as by removing a lens protector of a camera, which might indicate substitution of a first camera by a second camera. In the example of FIG. 4, camera/projector 405 can perform operations similar to those performed by camera 105 described above. In addition, camera/projector 405 includes semi-transparent lens protector 410, which may include a semi-silvered lens protector, which is capable of displaying an image generated by camera/projector 405 on lens protector 410 as well as on headliner 250 of vehicle 102. Accordingly, in an example, computer 104 can direct camera/projector 405 to generate an image, such as graphic symbol 315, which can also be observed by a camera portion of camera/projector 405. Computer 104 104 may direct camera/projector 405 to capture, at a first instant (i.e., moment in time), an image of graphic symbol 315 at a first focal length, e.g., $f_1$. Computer 104 can then direct camera/projector 405 to capture, at a second instant, an image of graphic symbol 315 at a second focal length e.g., $f_2$. Computer 104 can then compare an image captured at the first instant, e.g., at focal length $f_1$, with an image captured at the second instant, e.g., at focal length $f_2$. By way of such comparison, computer 104 may determine that camera/projector 405 includes semi-transparent lens protector 410, indicating that camera/projector 405 has not been replaced with a different camera.

Figure 5:
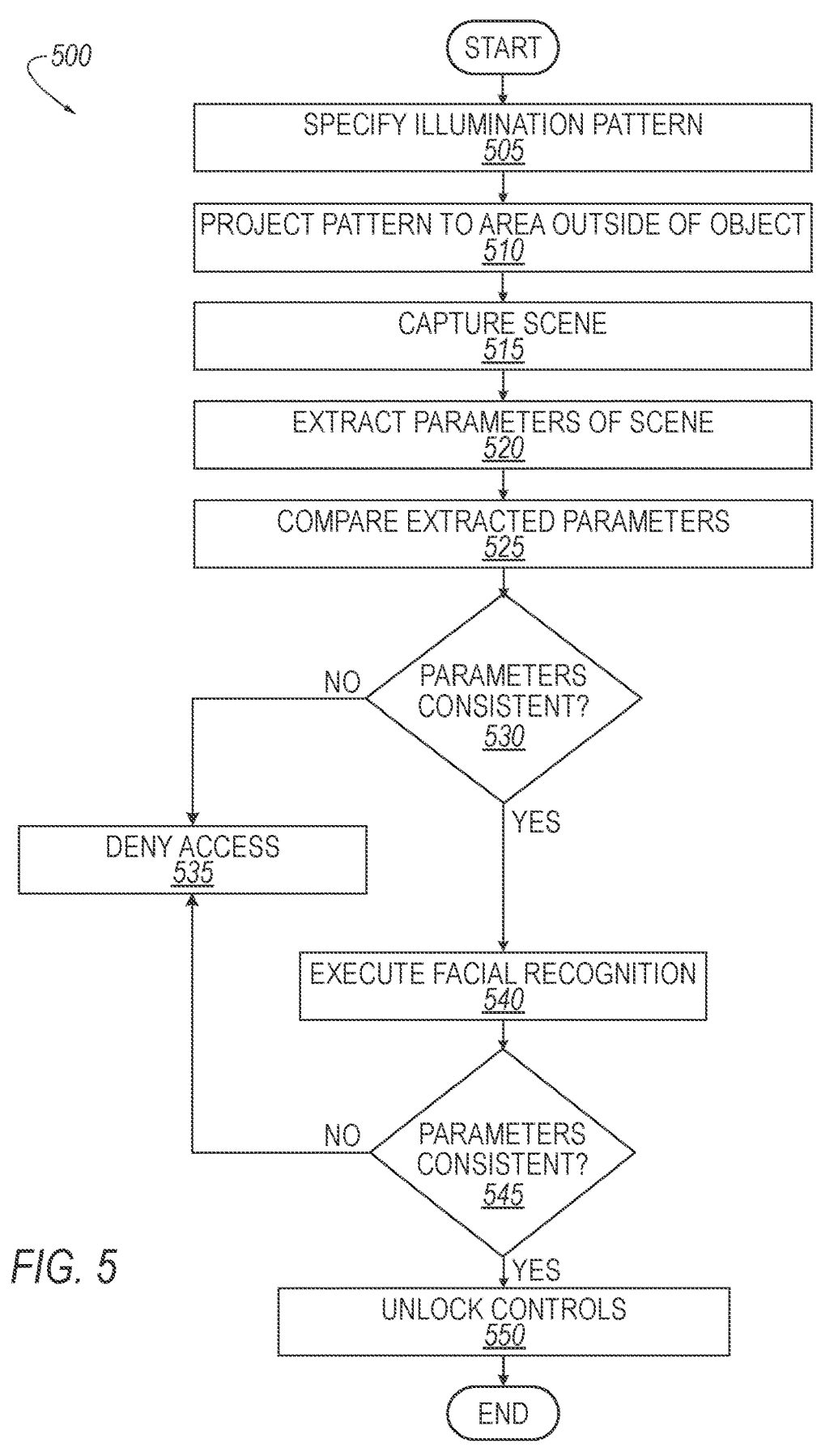
FIG. 5 is a process flow diagram of an example process for providing authentication of a scene.

FIG. 5 is a process flow diagram of an example process 500 for providing scene authentication. For example, the memory of computer 104 stores executable instructions for performing the steps of process 500, and/or such programming could be implemented in other computing devices, some other non-vehicle computer, and/or other computing devices of vehicle 102. Further, example process 500 can be utilized to provide scene authentication in other applications for which a scene includes a an image of a machine-recognizable object along with areas outside of the object. Thus, although process 500 is described as a vehicle-based process, it is to be understood that process 500 could be applied in the context of authenticating any camera-captured scene, such as a scene that includes an image of an operator of the vehicle, a scene that includes a manufactured object, a scene that includes an individual's finger in a fingerprint recognition application etc., as described herein.

As a general overview of a vehicle-based process 500, vehicle computer 104, or a computer utilized in any scene authentication application, can execute programming to receive a captured scene that includes operator 260 positioned in the driver's seat of the vehicle. Vehicle computer 104 can specify an illumination pattern, e.g., a time-varying illumination pattern, which, via illumination controller 118, can activate illumination sources 120 to generate the illumination pattern. Illumination sources 120, e.g., positioned at or near headliner 250 of vehicle 102, may then blink or strobe, vary in color, brighten or dim, project machine-readable codes and/or graphic symbols, etc., which are visible in the background of operator 260. Camera 105 can then capture a scene that includes an image of operator 260 as well as the background, foreground, or any other area outside of the facial and/or other features of operator 260. Digitized images representative of the captured scene can then be analyzed by computer 104 executing image signal processing to extract parameters from the area outside of the facial and/or other features of operator 260. Computer 104 can then execute a comparison between the extracted parameters and the specified illumination pattern. Based on a consistency between the extracted parameters and the specified illumination pattern, computer 104 can authenticate the captured scene. Computer 104 may then execute a facial recognition process so as to determine whether operator 260 corresponds to an authorized operator of vehicle 102. Based on such determination, computer 104 can permit operator 260 to operate the vehicle. Conversely, based on an inconsistency between the extracted parameters and the specified illumination pattern, computer 104 can determine that the captured scene inauthentic and prevent operator 260 from operating the vehicle.

Process 500 begins at block 505, at which computer 104 specifies an illumination pattern to be generated by illumination sources 120 positioned at one or more locations visible to camera 105 of vehicle 102. An illumination pattern can include, for example, blinking or strobing of illumination sources, use of time-varying color patterns, machine-readable codes, graphic symbols, etc.

Process 500 may continue at block 510, which can include illumination controller 118 controlling illumination sources 120 to generate and/or project the specified illumination pattern onto an area outside of an object, e.g., the face and/or nearby features of operator 260 encompassed by ellipse 265. For example, illumination sources 120 may generate and/or project the specified illumination pattern onto a surface of headliner 250 visible to camera 105.

Process 500 may continue at block 515, at which camera 105 can capture a scene, e.g., 300, 301, 302, 303, that includes the area outside of ellipse 265, such as a portion of headliner 250 illuminated by the specified illumination pattern. In an example, camera 105 can be a camera capable of capturing still images of a scene, e.g., 300, 301, 302, 303, which can include an image of the facial and/or other features of operator 260, along with features visible in the background, foreground, or to a side of an ellipse or other shape that encompasses the facial and/or other features of operator 260. In another example, camera 105 can be a camera capable of capturing video segments (e.g., frames of video data) of a scene, which may include multiple images of the facial and/or other features of operator 260 along with features visible in the background, foreground, or to a side of an ellipse or other shape encompassing facial and/or other features of operator 260. In another example, a camera/projector, e.g., camera/projector 405, can capture an image of graphic symbol 315, utilizing a first focal length ($f_1$) and an image of graphic symbol 315 utilizing at a second focal length ($f_2$). Block 515 can camera 105 or camera/projector 405 transmitting signals representing camera-captured scene(s) to computer 104.

Process 500 may continue at block 520, at which computer 104 executes image signal processing, e.g., according to known techniques for analyzing and extracting information from image data) to extract parameters of the scene captured via camera 105. Extracted parameters can include wavelengths, or ranges of wavelengths, of colored light projected onto headliner 250, frequencies of blinking or strobing of illumination sources positioned on headliner 250, patterns and/or numbers of lighted spots visible on headliner 250, content of machine-readable images, e.g., QR codes 310 and/or graphic symbols visible on headliner 250, etc. Extracted parameters can additionally include whether an image of a graphic symbol, e.g., graphic symbol 315, is visible on lens protector 410, captured by camera/projector 405 at a first focal length ($f_1$) and is also visible on headliner 250 of vehicle 102 captured by camera 105 at a second focal length ($f_2$).

Process 500 may continue at block 525, at which computer 104 can compare whether parameters of an illumination pattern extracted from a captured scene e.g., 300, 301, 302, 303, are consistent with the illumination pattern specified by computer 104 at block 505. Consistency between an extracted illumination pattern and a specified illumination pattern can be determined based on whether a specified color parameter extracted from a still image of a scene, e.g., 300, 301, 302, 303, is visible on headliner 250, whether content of a specified QR code, e.g., QR code 310, is visible on headliner 250, whether a specified pattern of spots is visible on headliner 250, etc. Consistency between an extracted illumination pattern can be determined based on whether a specified time-varying illumination pattern is visible in a video segment captured by camera 105 that includes multiple images of a scene, e.g., 300, 301, 302, 303, such as illumination patterns that vary from red, to green, to blue, whether particular ones of illumination sources 120 generate specified colors that specified time intervals, changes in brightening or dimming in accordance with specified timing parameters, etc. Alternatively, or in addition to, block 525 may compare parameters of a graphic symbol, e.g., 315, captured by camera/projector 405 at a first focal length ($f_1$) are consistent with parameters of a graphic symbol, e.g., 315, captured at a second focal length ($f_2$). Parameters of the captured graphic symbol may be compared with parameters of a graphic symbol specified by computer 104, as an illumination pattern, at block 505. In an example, consistency among parameters of a graphic symbol captured at a first focal length ($f_1$), graphic symbol captured at a second focal length ($f_2$), and a graphic symbol specified by computer 104 can be determined based on a threshold similarity (e.g., 85%, 90%, 95%, etc.) among the captured symbols and the specified graphic symbol.

Process 500 may continue at block 530, at which computer 104 may determine whether parameters of an illumination pattern specified at block 505 are consistent with parameters extracted from a scene, e.g., 300, 301, 302, 303. At block 530, based on computer 104 determining that a consistency exists between parameters of a specified illumination pattern and parameters extracted from the scene, the process may continue at block 540. Conversely, responsive to a determination that there is an inconsistency between parameters of a specified illumination pattern and parameters of the illumination pattern extracted from the scene, block 535 may be executed, at which access to vehicle controls can be denied.

Process 500 may continue at block 540, which can be performed in response to computer 104 determining consistency between specified illumination parameters and parameters extracted from a scene, e.g., 300, 301, 302, 303, computer 104 can execute image signal processing to determine whether the facial and/or other features of operator 260 are consistent with those of an authorized operator of vehicle 102. In an example, computer 104 can analyze an area that encompasses facial and/or other features of operator 260 located within a portion of the captured scene, such as the area within ellipse 265. In an example, computer 104 may determine a distance between the eyes of operator 260, a point that is equidistant between the eyes of operator 260 and the nose of operator 260, a distance between the eyes of operator 260 and the mouth of operator 260, etc. Such parameters may be compared with a set of stored parameters of individuals authorized to operate vehicle 102.

Process 500 may continue at block 545, at which computer 104 can determine consistency between the facial and/or other features of operator 260 and those of an individual authorized to operate vehicle 102. Facial and/or nearby features of an individual seated in the driver's seat of vehicle 102 may be determined to be consistent with those of an authorized operator in response to a measured distance between the eyes of operator 260, a measured distance between a point that is equidistant between the eyes of operator 260 and the nose of operator 260, and/or a measured distance between the eyes of operator 260 and the mouth of operator 260, etc., deviating from corresponding features of an authorized operator by, for example, less than 5%, less than 10%, etc. Alternatively, or in addition to, consistency between facial and/or other features of an individual seated in the driver's seat of vehicle 102 and an authorized operator of the vehicle may be determined utilizing the Viola Jones technique, a histogram of oriented gradients, and/or techniques that utilize a convolutional neural network. Responsive to computer 104 determining an inconsistency, e.g., facial and/or nearby features of an individual seated in the driver's seat of the vehicle deviating by greater than, for example, 5%, 10%, etc., from those of an authorized operator of the vehicle, the process may proceed to block 535, at which access to vehicle 102 may be denied. Denial of access to vehicle 102 may include computer 104 inactivating one or more controls of vehicle 102.

At block 550, at which, in response to computer 104 determining that facial and/or other features of operator 260 are consistent with those of an authorized operator of vehicle 102, computer 104 can unlock controls of vehicle 102, thereby permitting operator 260 to operate the vehicle. For example, unlocking of controls of vehicle 102 can actuate an ignition switch, which permits current to conduct from a battery to a starter motor of vehicle 102. In another example, unlocking of controls of vehicle 102 can actuate a relay to permit current to conduct from a battery of vehicle 102 to an electric motor to propel the vehicle. In other examples, unlocking of controls of vehicle 102 can permit access to an HMI of the vehicle, actuate steering of the vehicle, etc.

After block 550, process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. The adjectives "first" and "second" are used throughout this document as identifiers and are not intended to signify importance, order, or quantity. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A method comprising:

projecting a first specified time-varying illumination pattern to an area outside of an object undergoing authentication;

capturing images of the object and a portion of the area outside of the object;

authenticating a scene including the images based on comparing the first specified time-varying illumination pattern with a second time-varying illumination pattern extracted from the images; and determining consistency between the first specified time-varying illumination pattern with a third time-varying illumination pattern projected on a semi-transparent lens protector of a camera to capture the images of the object.

2. The method of claim 1, wherein capturing images comprises capturing video images.

3. The method of claim 1, wherein projecting the first specified time-varying illumination pattern comprises projecting a pattern of colored lighting on a background area outside of the object.

4. The method of claim 1, wherein projecting the first specified time-varying illumination pattern comprises strobing of lighting visible on a background area outside of the object.

5. The method of claim 1, wherein projecting the first specified time-varying illumination pattern comprises projecting one or more spots on a background area outside of the object.

6. The method of claim 1, wherein projecting the first specified time-varying illumination pattern includes projecting a symbol on a background area outside of the object.

7. The method of claim 1, wherein the area outside of the object undergoing authentication includes an interior portion of a vehicle.

8. The method of claim 1, wherein the area outside of the object undergoing authentication includes a headliner portion of a vehicle.

9. The method of claim 1, wherein the first specified time-varying illumination pattern comprises illumination utilizing wavelengths outside of the visible light spectrum.

10. A system comprising:

a computer including a processor coupled to a memory, the memory storing instructions including instructions executable by the processor to:

control an illumination source to project a first specified time-varying illumination pattern to an area outside of an object undergoing authentication;

receive from a camera captured images of the object and a portion of the area outside of the object;

authenticate a scene including the images based on a comparison between the first specified time-varying illumination pattern with a second time-varying illumination pattern extracted from the images; and determine consistency between the first specified time-varying illumination pattern with a third time-varying illumination pattern projected on a semi-transparent lens protector of the camera to capture the images of the object.

11. The system of claim 10, wherein the captured images are images in a video segment.

12. The system of claim 10, wherein the object is a portion of an operator's face.

13. The system of claim 10, wherein the first specified time-varying illumination pattern includes a pattern of colored lighting projected on a background area outside of the object.

14. The system of claim 10, wherein the first specified time-varying illumination pattern includes strobing of lighting projected on a background area outside of the object.

15. The system of claim 10, wherein the first specified time-varying illumination pattern includes time-varying projection of one or more spots projected on a background area outside of the object.

16. The system of claim 10, wherein the first specified time-varying illumination pattern includes a time-varying pattern of symbols projected on a background area outside of the object.

17. The system of claim 10, wherein the first specified time-varying illumination pattern includes a quick response (QR) code.

18. The system of claim 10, wherein the first specified time-varying illumination pattern comprises illumination utilizing wavelengths that are outside of the visible light spectrum.

19. The system of claim 10, wherein the area outside of the object undergoing authentication includes an interior portion of a vehicle.

20. The system of claim 10, wherein the area outside of the object undergoing authentication includes a headliner portion of a vehicle.

* * * * *